United States Patent [19]

O'Connor et al.

[11] Patent Number: 4,955,568
[45] Date of Patent: Sep. 11, 1990

[54] PANHEAD FOR CAMERA

[75] Inventors: Chadwell O'Connor; Joel W. Johnson, both of Newport Beach, Calif.

[73] Assignee: Q-CO Industries, Inc., New York, N.Y.

[21] Appl. No.: 424,495

[22] Filed: Oct. 20, 1989

[51] Int. Cl.⁵ ........................................... F16M 11/12
[52] U.S. Cl. ................................................... 248/183
[58] Field of Search ............... 248/584, 661, 418, 183, 248/185, 186, 636, 123.1, 292.1, 575, 577; 354/293; 188/70 R, 71.5, 71.4

[56] References Cited

U.S. PATENT DOCUMENTS

| | | |
|---|---|---|
| 206,393 | 7/1878 | Ellinger . |
| 1,898,469 | 2/1933 | Tonsor ................... 248/183 |
| 2,111,012 | 3/1938 | Tondreau ............... 248/183 |
| 2,905,421 | 9/1959 | O'Connor ............... 248/186 |
| 2,998,953 | 9/1961 | O'Connor ............... 248/183 |
| 3,180,603 | 4/1965 | O'Connor ............... 248/183 |
| 3,291,431 | 12/1966 | Daniel, Jr. . |
| 3,552,699 | 1/1971 | Baker ..................... 248/183 |
| 3,578,347 | 5/1971 | O'Connor . |
| 4,083,524 | 4/1978 | O'Connor ............... 248/183 |
| 4,113,215 | 9/1978 | Stapleton . |
| 4,177,884 | 12/1979 | Vinten . |
| 4,466,590 | 8/1984 | Parks ..................... 248/185 |
| 4,726,253 | 2/1988 | Russell . |
| 4,732,357 | 3/1988 | Lindsay ................. 248/185 |

FOREIGN PATENT DOCUMENTS 8101872  7/1981  PCT Int'l Appl. ............ 248/185

Primary Examiner—Ramon O. Ramirez
Assistant Examiner—Robert A. Olson
Attorney, Agent, or Firm—Leydig, Voit & Mayer

[57] ABSTRACT

A camera panhead, for panning the camera about a vertical axis and tilting the camera about a horizontal axis, including fluid drag systems and a counterbalance system. The fluid drag systems each include a drag disk assembly secured to the rotating shaft and drag sector assemblies pivotally mounted to the housing and disposed about the circumference of the disk assembly to define a space containing viscous fluid. The level of drag exerted may be adjusted by pivoting the sector assemblies toward or away from the disk assembly to vary the space containing viscous fluid. The counterbalance system includes two spring sets mounted in planes perpendicular to the tilt axis. As the camera tilts, one end of each of the springs remains relatively stationary as the opposite ends rotate about the tilt axis to exert a restoring torque to counterbalance the camera. The system may be adjusted to vary the level of restoring torque exerted.

20 Claims, 7 Drawing Sheets

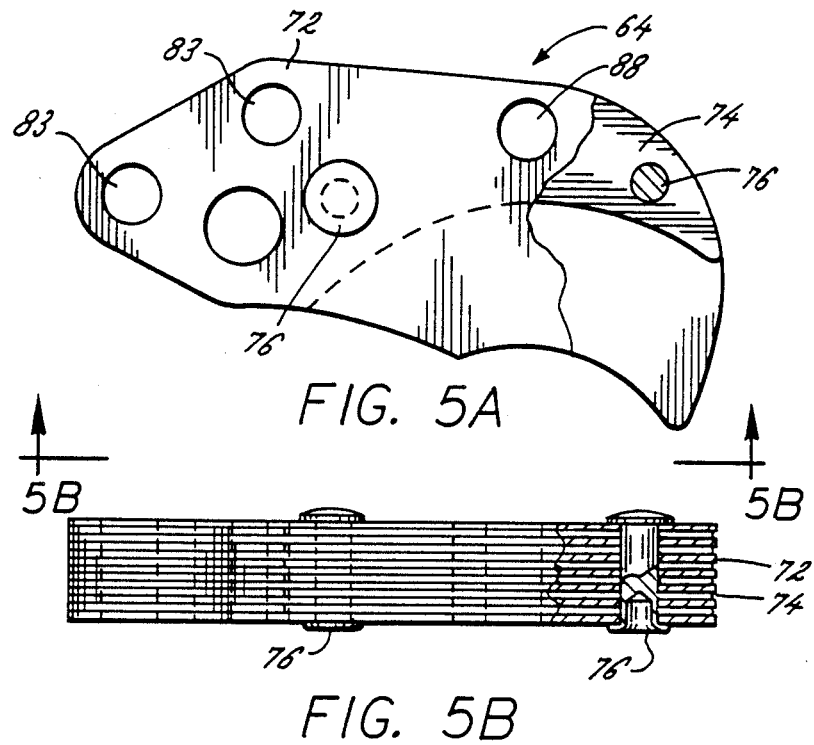
FIG. 5A
FIG. 5B
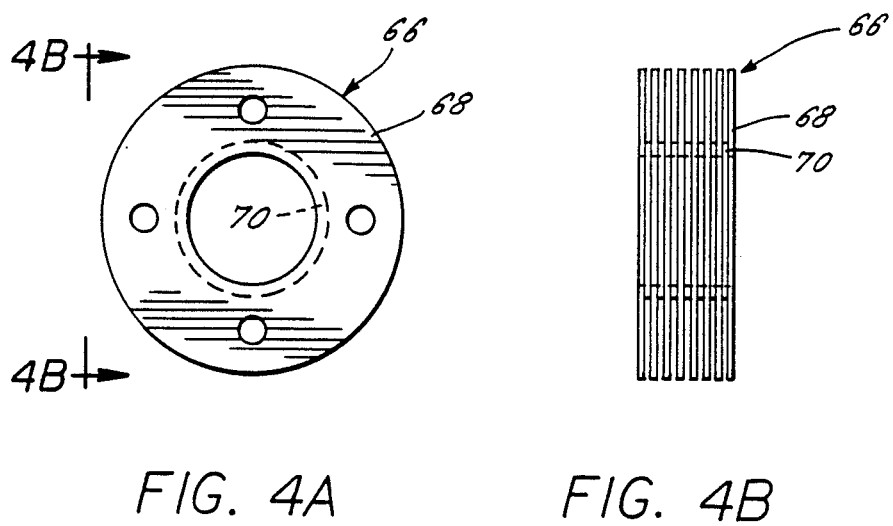
FIG. 4A
FIG. 4B

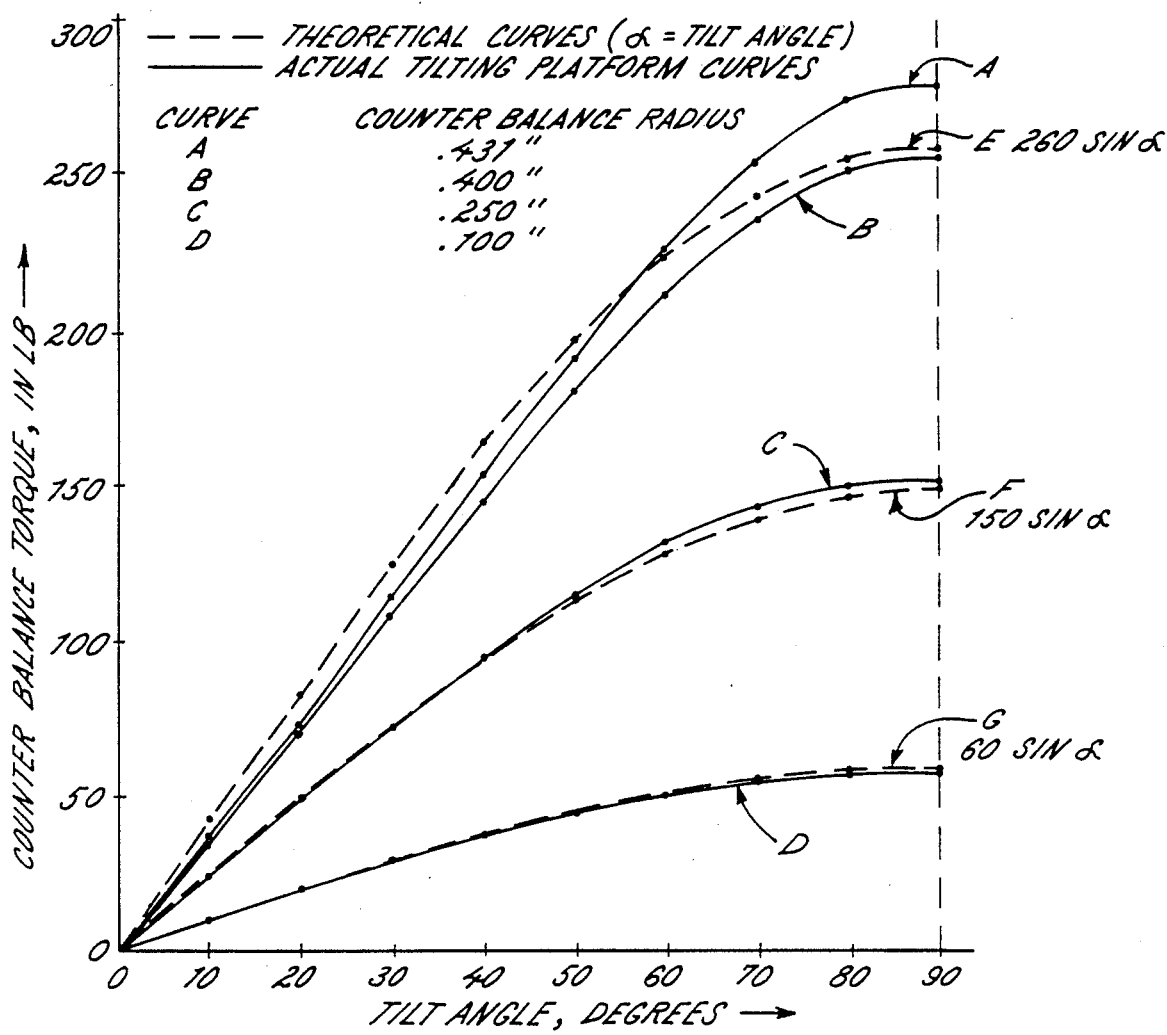
FIG. 11
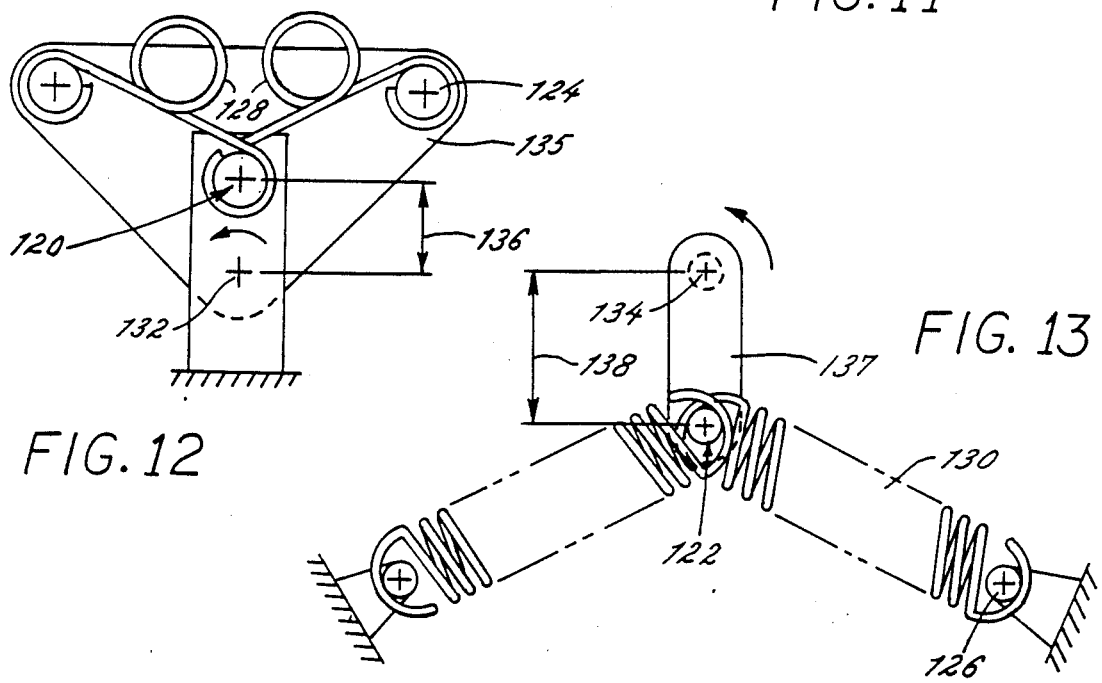
FIG. 12
FIG. 13

PANHEAD FOR CAMERA

BACKGROUND

The present invention relates generally to optical equipment supporting devices and more particularly concerns a camera panhead.

In motion and television filming, it is often necessary to sweep a camera about a horizontal or vertical axis, or both, in order to cover a wide scene or follow a moving object. One of the most difficult functions that must be performed by a panhead is permitting the mounted camera or other instrument to be smoothly scanned back and forth, and up and down. Both fast and slow movement must be smooth and uniform, free from jerking or scattering when starting or stopping. Such movement may be difficult due to the inertia of the supported instrument and the frictional drag inherent in the mechanical operation of the panhead itself. Achieving smooth and uniform movement may be further complicated by other factors such as the substitution of supported instruments having different weights or centers of gravity, and environmental effects due to the broad temperature ranges in which the panhead is required to function. Consequently, to provide for maximum versatility and efficiency during usage, the panhead should provide precise movement and be light, and easily and quickly adjustable.

Various designs of fluid drag systems, such as those in U.S. Pat. Nos. 2,905,421, 2,998,953, and 3,180,603, have been utilized in panheads in order to provide smooth panning and tilting movements. While these systems operate effectively to provide adjustable uniform drag, many utilize systems in which an adjustment knob may have to be turned several revolutions in order to adjust the level of drag exerted by the fluid system. Such drag adjustment designs may be inappropriate for usage when an operator must quickly adjust the pan or tilt drag.

Further, a camera is often moved rapidly during use. The torque load resulting from such rapid panning or tilting movement may cause the drag components to automatically move or readjust, which results in imprecise movement due to backlash or slop.

A counterbalancing system is often used to counterbalance the weight of the mounted instrument to provide a smooth tilting movement. While the torque exerted by the tilting camera increases substantially linearly as the panhead tilts through small angles, the torque levels off and follows a generally sinusoidal curve as the tilt angle increases. Consequently, simple counterbalancing systems, such as linear springs, generally only operate effectively through low tilt angles. While more complicated counterbalancing systems, such as those using cam and roller devices, may operate more effectively through a wider range of tilt angles, many of these devices also do not work well at higher tilt angles.

Accordingly, it is a general aim of the invention to provide a panhead that smoothly and uniformly pans and tilts. Another object is to provide a panhead which provides precise movement with minimal backlash or slop.

A further object is to provide a panhead which effectively counterbalances the weight of a supported instrument by exerting a restoring torque approximately equal to the torque exerted by the tilting instrument. A related object is to provide a device which counterbalances the weight of the supported instrument without the use of cams and rollers. Another object is to provide a panhead which have a panning range of 360° and a full tilt range 90° from horizontal in both the upward and downward directions.

An additional object of the invention is to provide a counterbalancing system which may be easily adjusted for varying weights and heights of mounted equipment. A further object is to provide a fluid drag system which may be quickly and easily adjusted to desired degrees of drag for panning and tilting movements. A related object is to provide a panhead which may be locked at any desired angle, horizontally or vertically, without shifting the position of the supported instrument.

SUMMARY

The panhead includes independently adjustable pan and tilt fluid drag systems, and an adjustable counterbalance system that exerts a restoring torque which substantially counterbalances the torque exerted by a supported instrument. The camera or other instrument is mounted on a platform atop a drum which rotates about a horizontal axis to provide tilting movement of the camera. The drum is rotationally supported in a housing, which is mounted for rotation on a base. The housing rotates about a vertical axis to provide the panning movement of the panhead. The counterbalance system contained within the tilt drum includes two or more springs which are disposed in the planes which are perpendicular to the horizontal tilt axis. One end of each spring is mounted at a common axis parallel to the horizontal tilt axis; both axes lie in a common vertical plane. The other end of each spring is mounted at an equal angle with respect to the vertical plane. During rotation of the tilt drum, either the commonly mounted ends of each spring or the ends of each spring mounted at an angle rotate about the horizontal axis, while the other end of each spring effectively remains stationary. As a result, one spring shortens while the other spring lengthens as the tilt drum rotates, such that the counterbalance spring system exerts a restoring torque which follows a generally sinusoidal curve as the tilt angle of the drum increases. Independent fluid drag systems control rotation about the horizontal and vertical axes. Each drag system includes a series of linked drag sectors disposed about a drag disk assembly. The space between the drag sector assemblies and the drag disk assembly contains a viscous fluid such that, as the drag disk assembly and drag sector assemblies rotate with respect to one another, they exert a drag force which facilitates smooth and uniform rotation of the panhead components.

DRAWINGS

FIG. 4A is a plan view of a drag disk assembly.

FIG. 4B is a view of the drag disk assembly taken along line 4B—4B in FIG. 4A.

FIG. 5A is a plan view of a drag sector assembly partially cut away.

FIG 5B is a view of the drag sector assembly taken along line 5B—5B in FIG. 5A.

FIG. 11 is a diagram of actual and theoretical counterbalance torque curves for the counterbalance assembly shown in FIG. 6.

FIG. 12 is a schematic of an alternate embodiment of the counterbalance assembly shown in FIG. 6.

FIG. 13 is a schematic of an alternate embodiment of the counterbalance assembly shown in FIGS. 6 and 12.

DESCRIPTION OF THE PREFERRED EMBODIMENTS

While the invention will be described in connection with preferred embodiments, it will be understood that I do not intend to limit the invention to those embodiments. On the contrary, I intend to cover all alternatives, modifications, and equivalents as may be included within the spirit and scope of the invention as defined by the appended claims.

Figure 1:
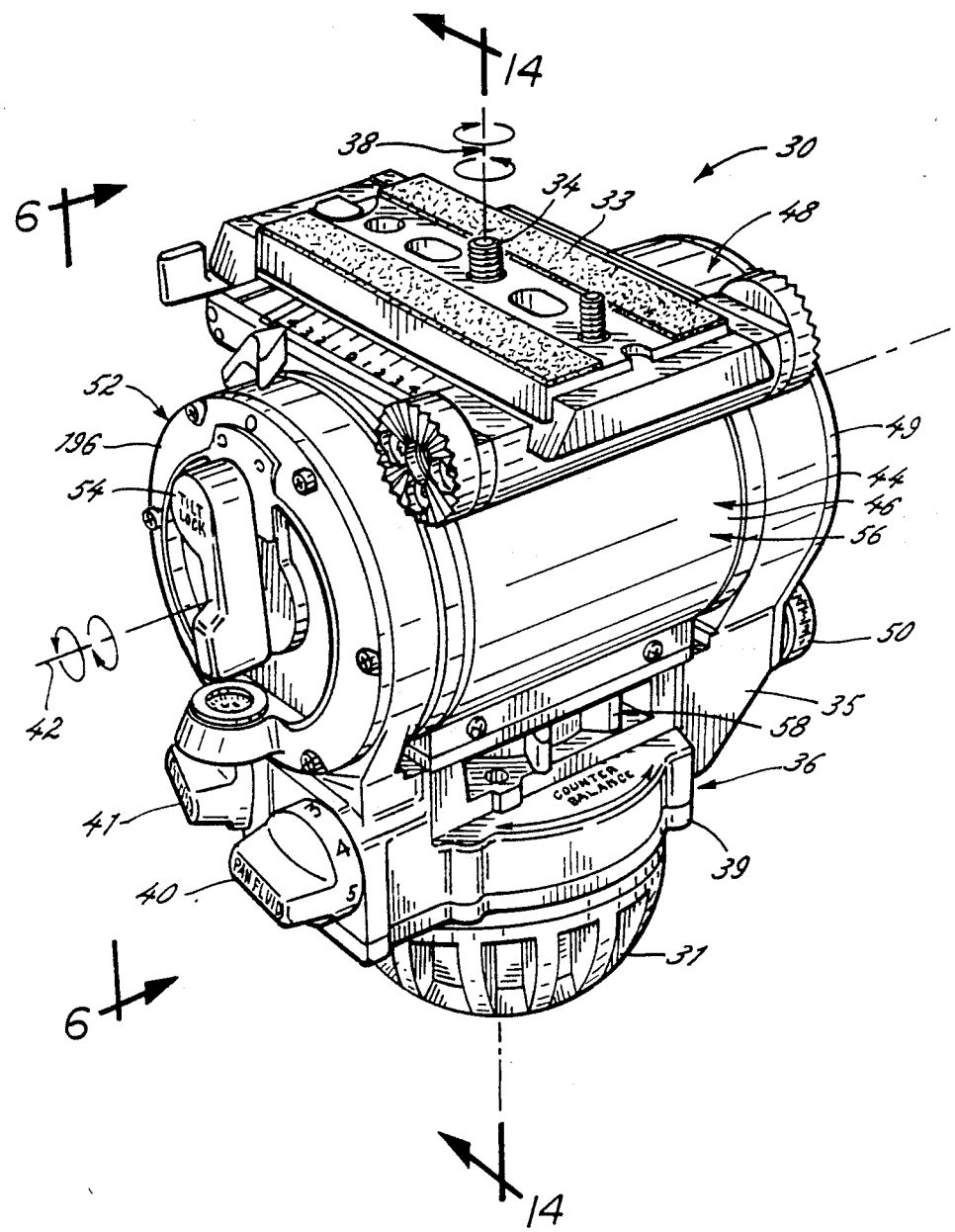
FIG. 1 is a perspective view of a panhead constructed according to the present invention.

Turning first to FIG. 1, there is shown a perspective view of a panhead 30 constructed according to the present invention. The panhead 30 is shown secured to a claw ball base 31, such as the base disclosed in U.S. Pat, No. 4,019,710, by way of a plurality platform adjustment screws 32 (shown in the sectional view in FIG. 14). For mounting a camera or other instrument (not shown), the panhead 30 is provided with a platform 33 through which extends a conventional instrument mounting screw 34. As will be apparent to those skilled in the art, this screw 34 threads upwardly into a threaded hole conventionally provided in an instrument to draw the instrument tightly and securely against the platform 33.

The panhead is defined primarily by a main body housing 35, which supports assemblies that control panning and tilting movements of the panhead. The pan drag assembly 36, which includes a viscous fluid, controls rotation of the housing 35 about the vertical axis 38. The assembly 36 is located in the lowermost portion of the housing 35. A pan cover 39 is secured to the lower surface of the housing 35 to seal the fluid in the assembly 36 and prevent dirt or foreign materials from interfering with operation of the drag assembly 36. In order to allow quick and easy adjustment of the level of drag exerted during movement about a vertical axis, the panhead 30 is provided with an adjustment knob 40. A numerical scale along the knob 40 permits easy identification of level of drag for which the pan drag assembly is adjusted. Further, the panhead 30 may be locked at substantially any degree of rotation about the vertical axis 38. In order to secure the housing 35 against movement relative to the base 31, a rotatable pan brake knob 42 is likewise provided adjacent the adjustment knob 40.

The platform 33 may also be rotated about a horizontal axis 42 to tilt a supported instrument up to 90° upward or downward. To permit the tilting movement, the platform 33 is secured to the tilt drum 44, which is journaled for rotation with respect to the housing 35. A stationary tilt drum cover 46 encloses the rotatable tilt drum 44 to prevent dirt or foreign materials from interfering with the tilting movement and to provide an attractive appearance. In order to provide smooth tilting movement of the tilt drum 44, a tilt drag assembly 48, which includes a viscous fluid, is provided within the housing 35 at one end of the drum 44. A tilt cover 49 is sealed to the housing 35 to contain the fluid within the housing 35 and to likewise prevent dirt and other foreign materials from interfering with the operation of the drag assembly 48. Quick and easy adjustment of the level of tilt drag exerted may be made by movement of the tilt fluid adjustment lever 50. The tilt fluid adjustment lever 50 may be provided with a numerical scale (not shown), similar to the numerical scale on the pan fluid adjustment lever 40, so that an operator may easily identify the level of drag exerted. In order to secure the tilt drum 44 and the attached platform 33 at a desired tilt angle, a tilt lock assembly 52 is provided in the housing 35 at opposite ends of the tilt drum 44. An operator may easily lock the tilt drum 44 against rotation relative to the housing 35 by turning the tilt lock lever 54.

As an instrument supported on the platform 33 is tilted about the horizontal axis 42, the instrument exerts a torque which increases as the tilt angle increases. In order to permit uniform tilting of the instrument, the panhead 30 is provided with a counterbalance assembly 56. The counterbalance assembly 56 includes a spring system which is disposed within the tilt drum 44 directly below the platform 33. The counterbalance assembly 56 exerts a restoring torque which approximates the torque exerted by the tilting instrument so that an operator is not required to work against the weight of the instrument as it tilts and so that the instrument will remain substantially steady at a tilted angle without the operator supporting it. Because instruments having different weights or centers of gravity exert different levels of torque, the panhead 30 provides a means by which the level of restoring torque may be adjusted to approximate the level of torque exerted by different instruments. To adjust the level of restoring torque, a counterbalance adjustment knob 58 disposed directly below the tilt drum 44 may be rotated. In this way, the operator may easily and quickly adjust the counterbalance torque as well as the locking mechanisms and the level of drag exerted for both tilting and panning movements.

Figure 3:
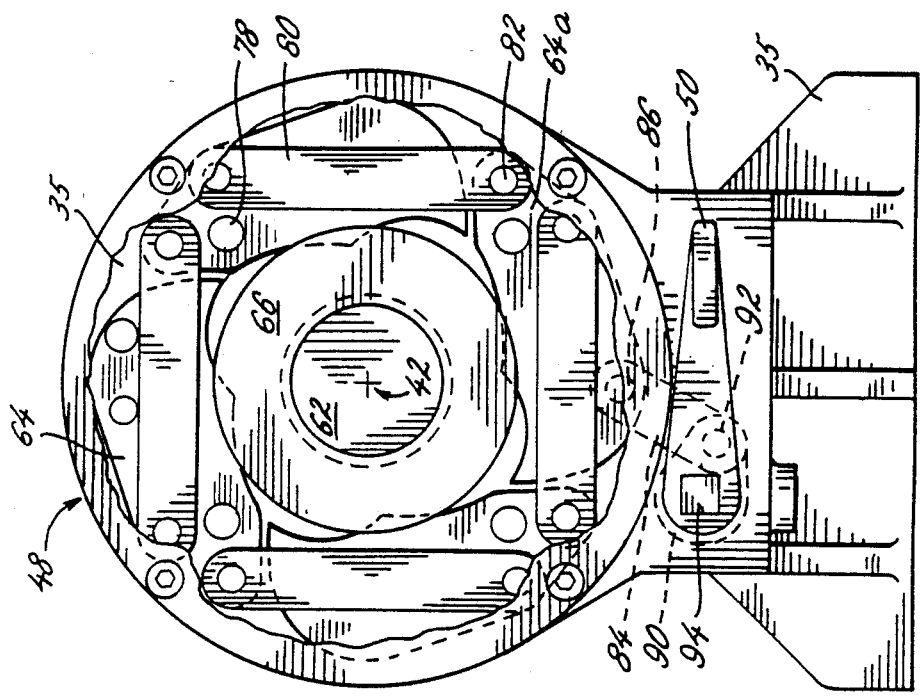
FIG. 3 is a plan view of the drag assembly adjusted for maximum drag resistance.
Figure 2:
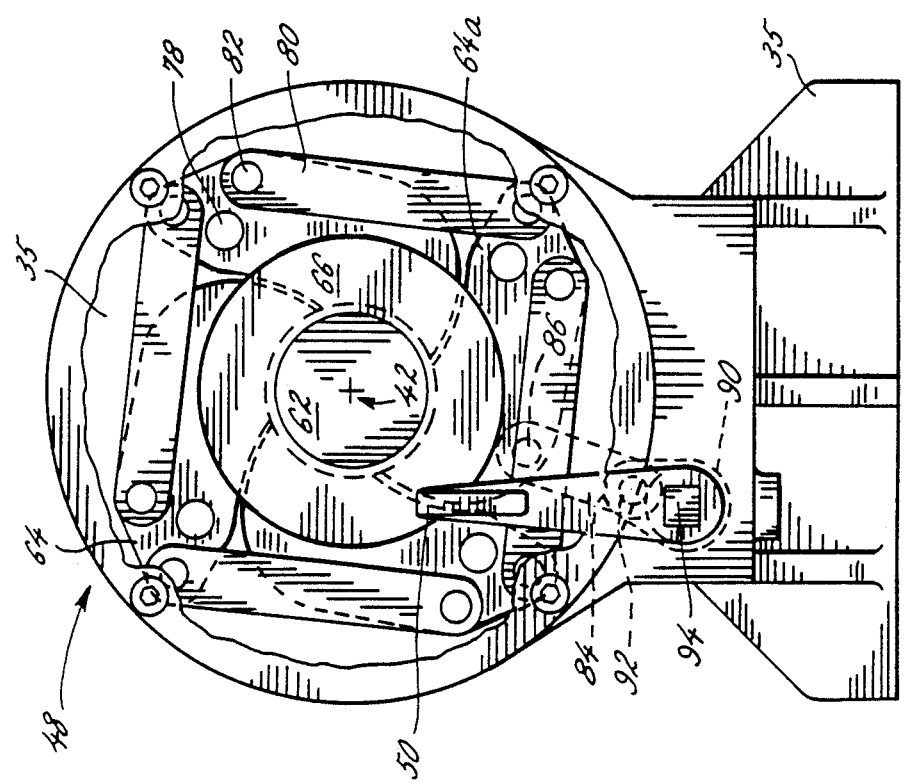
FIG. 2 is a plan view of the drag assembly adjusted for minimum drag resistance.

The drag assemblies 36, 48 may best be understood by referring to FIGS. 2 and 3, which show the horizontal axis drag system 48. Although oriented differently, the vertical axis drag system 36 is constructed and operates very similarly to the horizontal axis system 48. During operation, a central shaft 62 rotates with respect to the housing 35 about the horizontal or vertical axis 42 or 38. The drag assembly 48 includes a plurality of drag sector assemblies 64 which are pivotally mounted to the housing 35 and are disposed about the shaft 62, and a drag disk assembly 66, which is secured to the shaft 62 for rotation therewith.

As shown in FIGS. 2 and 3, the disk assembly 66 and the sector assemblies 64 overlap to define a space therebetween. An adjustable drag is imposed on the rotation of the shaft 62 by interposing a viscous fluid between the surfaces of the drag disk assembly 66 and the cooperating surfaces of the sector assemblies 64. The viscous substance employed may be any one of a wide variety, examples being oil, grease, glycerine, and the like. The frictional drag resistance created by the drag disk assembly 66 and opposed sector assemblies 64 is directly responsive to the thickness of the intervening film of viscous fluid. The thinner this layer, the more resistance to relative movement between the opposed surfaces results. Thus, the amount of drag resisting rotation of the shaft 62 with respect to the housing 35 may be controlled by adjusting the space between the drag disk assembly 66 and the sector assemblies 64. It will be appreciated by one skilled in the art that the drag assembly 48 shown in FIG. 2 is adjusted to provide maximum drag resistance, as the space defined by the sector assemblies 64 and the drag disk assembly 66 is at a minimum; conversely, the drag assembly 48 as shown in FIG. 3 is adjusted to provide minimum drag resistance, as this space is at a maximum.

The drag disk assembly 66 is shown in more detail in FIGS. 4A and 4B. The assembly 66 is circular with a central opening extending therethrough. It comprises alternating flat circular drag disks 68 and smaller flat circular drag disk spacers 70.

As shown in FIGS. 5A and 5B, a drag sector assembly similarly includes alternating sectors 72 and sector spacers 74. Consequently, when assembled in the drag assemblies 36, 48, the sectors 72 and disks 68 will overlap, as shown in FIGS. 2 and 3. The sectors 72 will enter the spaces between the drag disks 68 as defined by the disk spacers 70, and the drag disks 68 will enter the spaces between the sectors 72 as defined by the sector spacers 74.

The sectors 72, sector spacers 74, drag disks 68, and drag disk spacers 70 may be fabricated using a punch press die. The drag sector assembly 64 may be assembled by alternately stacking the sectors 72 and the sector spacers 74, and securing the unit together with the rivets 76. The drag disk assembly 66 is likewise assembled by alternately stacking the drag disks 68 and the drag disk spacers 70, and then securing the unit together.

In assembly of the drag systems 36, 48, the sector assemblies 64 are pivotally mounted to the housing 35 on dowel pins 78. As shown in FIGS. 2 and 3, and as explained above, the drag sector assemblies 64 are pivotally mounted to the housing 35 so that the space between the drag sector assemblies 64 and the drag disk assembly 66 may be varied to control the amount of drag resisting the tilting movement of the tilt drum 44.

So that the sector assemblies 64 will be uniformly spaced from the drag disk assembly 66 and so that the sector assemblies 64 will pivot substantially the same degree at substantially the same time, the sector assemblies 64 are coupled together by way of drag links 80. The drag links 80 are pivotally coupled to the drag sector assemblies 64 by dowel pins 82 which extend through holes 83 in the assemblies 64.

In accordance with one aspect of the invention, in order to control the space between the sector assemblies 64 and the drag disk assembly 66, and consequently the resultant drag, the invention provides a linkage system which may be operated by a lever 50 or knob (not shown in FIGS. 2 and 3), such as the tilt control lever 50 or the pan fluid drag knob 40. A drag link driver 84 is pivotally coupled to a sector assembly 131, which will be referred to as the driver sector assembly 64a, by a drag pin 86 assembled through the hole 88 in the driver sector assembly 64a. The opposite end of the drag link driver 86 is coupled to a crank arm 90 by another dowel pin 92. The opposite end of the crank arm 90 is secured to the tilt control shaft 94, which is likewise secured to the lever 50 (or knob 40). In this way, and as illustrated FIGS. 2 and 3, as an operator rotates the lever 50 (or knob 40 to rotate worm gear 95a and gear 95b shown in dotted lines in FIG. 14) in the clockwise direction, the crank arm 90 and the drag link driver 84 operation to pivot the driver sector assembly 64a away from the drag disk assembly 66, as shown in FIG. 3.

As the driver sector assembly 64a pivots, the dowel pins 82 and the ends of the drag links 80 rotate about the dowel pin 78. This rotation is translated to the remaining sector assemblies 64 by the drag links 80 to cause the assemblies 64 to pivot on their respective dowel pins 78 an equal degree into or out of engagement with the drag disk 66. Thus, the rotation of the lever 50 or knob 40 controls the distance between the drag link sector assemblies 64 and the drag disk assembly 66 to control the drag force exerted on the rotating shaft 62.

In accordance with an important aspect of the invention, the drag system 36, 48 operates with minimal slop or backlash. During operation of conventional fluid drag systems, torque loads exerted on the drag components during rapid panning and tilting may cause the components to change their relative position. This movement may cause slop or backlash as the drag controls are adjusted. The invention provides a drag system design 36, 48 in which the torque loads exerted on each sector assembly 64 translate directly to the dowel pin 78 on which the assembly 64 is pivotally mounted to the housing 35. As a result, the torque exerted on the sector assemblies 64 does not cause the assemblies 64 to adjust their relative position and move the lever 50 or knob 40. In this way, the drag assembly 36, 40 provides precise movement with minimal slop or backlash.

Another important aspect of the invention, the counterbalance assembly 56, will be described with reference to FIGS. 6 through 10. The counterbalance assembly is provided to counterbalance the torque exerted by the mounted instrument as it is tilted about the horizontal tilt axis 42 and holds the instrument substantially steady when the instrument is released in a tilted position, as explained above.

Figure 6:
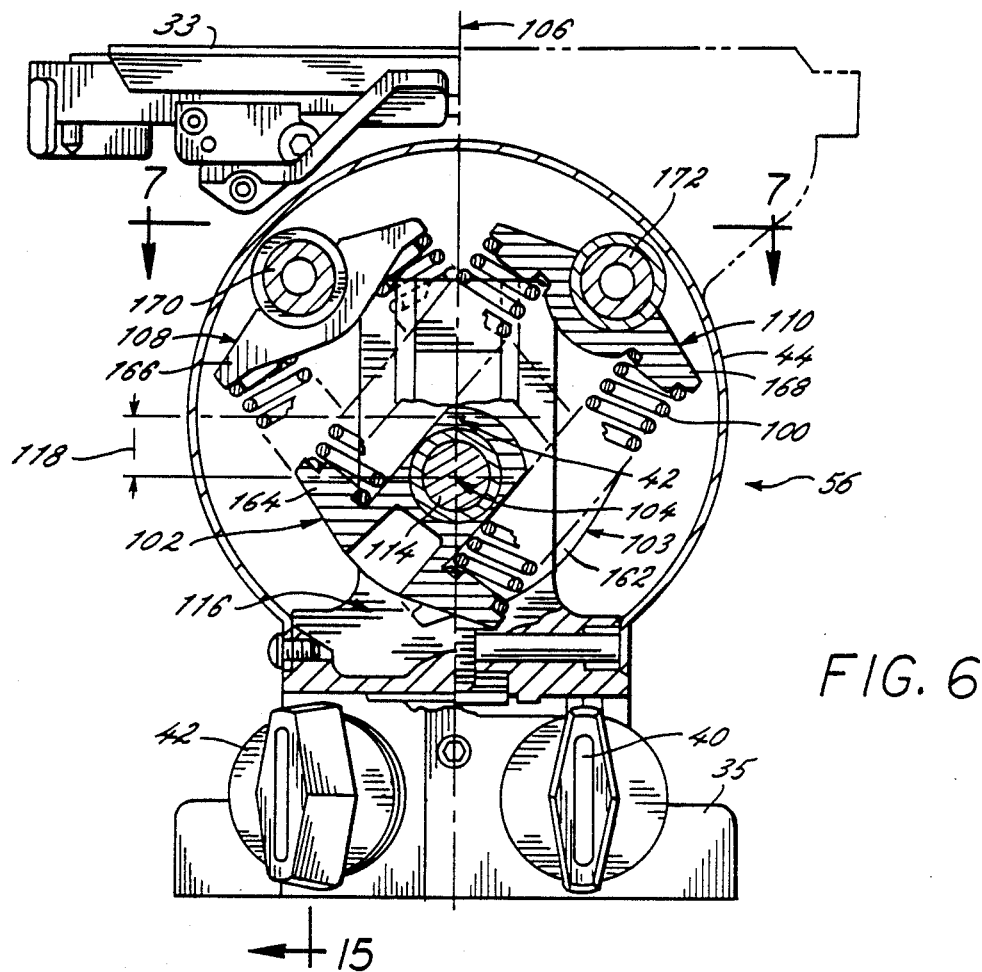
FIG. 6 is a partial sectional view taken along line 6—6 in FIG. 1.

As best shown in FIG. 6, the counterbalance assembly 56 mounted within the tilt drum 44 includes two pairs of springs 100 disposed in planes which are substantially perpendicular to the horizontal tilt axis 42 of the tilt drum 46. The ends of each pair of springs 100 are seated in rocker brackets 102, 103 journaled on a common axis 104, which is parallel to the horizontal tilt axis 42 and is disposed in a substantially vertical plane 106 containing both axes 42, 104. The opposite ends of the pairs of springs 100 are seated in rocker brackets 108, 109 journaled at equal angles with respect to the vertical plane 106 containing both axes 42, 104.

To provide a restoring torque as the tilt drum 44 rotates, the spaced rocker brackets 108, 110 rotate about the horizontal tilt axis 42. The rocker brackets 102, 103, while journaled to the axis 42, remain effectively stationary. The restoring torque exerted by the counterbalance spring system 56 substantially approximates the torque exerted in the opposite direction by the increasingly tilted mounted camera. As will be appreciated from the discussion which follows, the magnitude of the restoring force exerted is predictable and may be easily adjusted to approximate the torque exerted by instruments having various weights and centers of gravity by adjusting the length of the springs 100 themselves, or the distance between the horizontal tilt axis 42 and the common axis 104, which will be referred to as the counterbalance radius 118.

Figure 8:
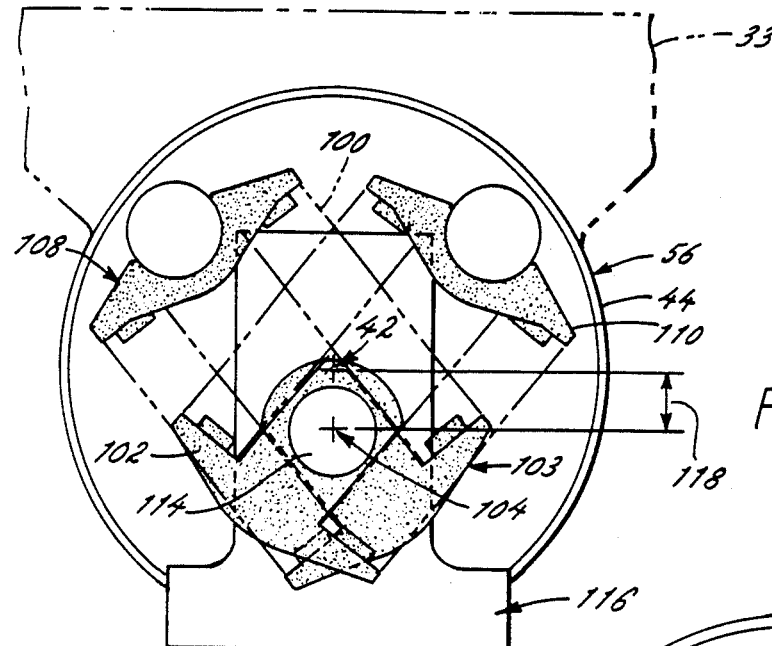
FIG. 8 is a partial schematic view of the counterbalance assembly as shown in FIG. 6 in a level position.
Figure 9:
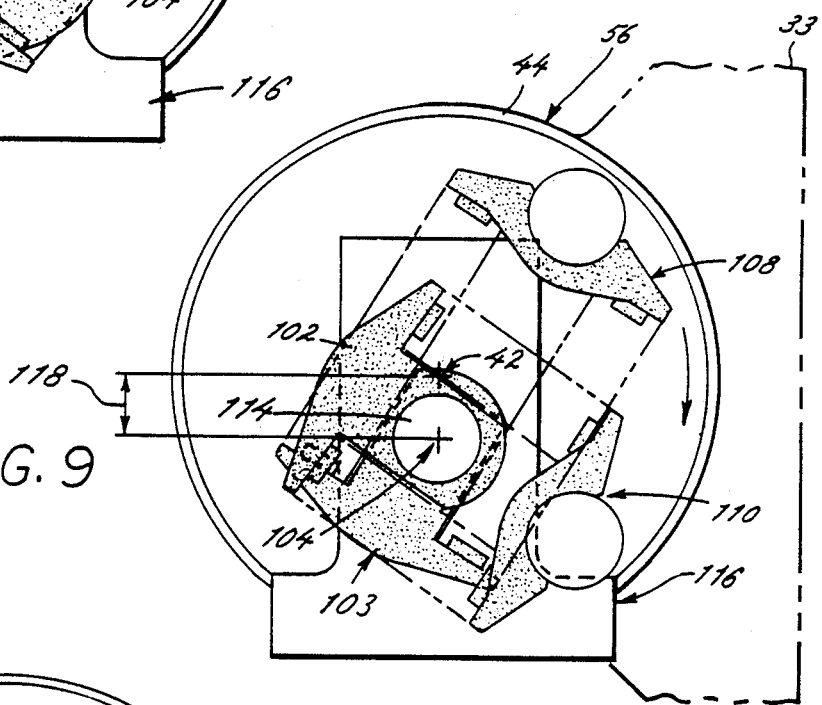
FIG. 9 is the partial schematic view of FIG. 8 rotated 90° from level in the clockwise direction.
Figure 10:
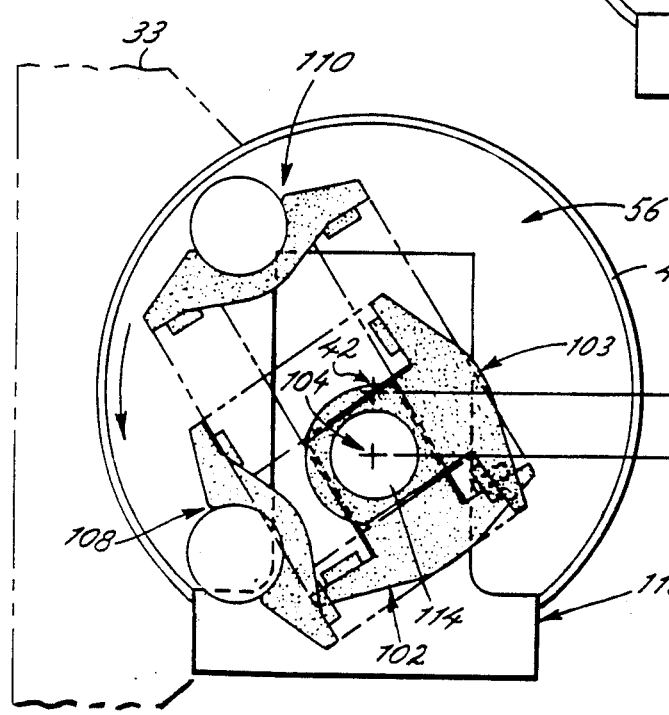
FIG. 10 is the partial schematic view shown in FIG. 8 rotated approximately 90° from level in the conunterclockwise direction.

Rotation of the counterbalance assembly 56 may best be understood by referring to the schematic drawings of the counterbalance assembly 56 shown in FIGS. 8 through 10. FIG. 8 shows the assembly 56 when the platform 33 is at the level position. FIGS. 9 and 10 illustrate the relative positions of the springs 100 and rocker brackets 102, 103, 108, 110 as the platform 33 and tilt drum 44 rotate 90° from level in the clockwise direction, and 90° from level in the counterclockwise direction, respectively. As is evident from the figures, so long as the horizontal tilt axis 42 and the common axis 104 do not coincide, or, in other words, so long as the counterbalance radius 118 is greater than zero, the springs 100 will not maintain a constant length as the platform 33 and tilt drum 44 rotate. As one spring set 100 lengthens, the other spring set 100 shortens during rotation. As a result of this lengthening and shortening of the springs 100, the counterbalance assembly 56 exerts a restoring torque which varies linearly at low tilt angles, and follows a generally curve as the tilt angle increases, as illustrated by curves A through D in FIG. 11.

The panhead 30 may be used to support various types of equipment. It will be appreciated by one skilled in the art that the torque exerted by the rotating mounted instrument is greater for a heavy instrument or an instrument having a high center of gravity than a lighter instrument or an instrument having a lower center of gravity. Consequently, the restoring counterbalance torque required will vary according to the weight and center of gravity of the supported instrument. According to another aspect of the invention, the counterbalance torque exerted by the counterbalance assembly 56 may be adjusted in order to effectively counterbalance different instruments.

In order to adjust the level of restoring torque exerted by the counterbalance assembly 56, the common axis 104, as defined by the crank pin 114, may be adjusted upward or downward within the crank pin support assembly 116. It will be appreciated that the level of restoring torque will vary as the counterbalance radius 118 is so adjusted. As the common axis 104 of the springs 100 approaches the tilt axis 42 about which the rocker brackets 108, 110 are rotated, the changed length of the springs 100 during rotation will decrease, and the restoring torque will likewise decrease. Thus, the actual counterbalance torque may effectively be adjusted to zero by causing the common axis 104 to coincide with the tilt axis 42.

As shown in FIG. 11, as the counterbalance radius 118 decreases, the resulting counterbalance torque will likewise decrease. Curves A-D show the actual counterbalance torque for the counterbalance assembly 56 as the distance of the counterbalance radius 118 decreases. Curve A represents the actual tilting platform 33 curve for a counterbalance radius 118 of 0.431 inches. Curves B, C, and D show curves for radii of 0.400, 0.250, and 0.100 inches, respectively.

According to an important aspect of the invention, the actual counterbalance curves closely approximate the predicted theoretical torque exerted by the tilting platform 33 and an instrument supported thereon. In this way, an operator may adjust the counterbalance assembly 56 to attain the optimum restoring torque required to counterbalance the rotation of the platform 33 and the supported instrument. The theoretical equation for the restoring torque required to counterbalance the weight of the tilting platform 33 and instrument may be calculated using the following equation:

$$\text{restoring torque} = W \times \sin \alpha$$

where

W = combined weight of the platform 33 and the supported instrument x = distance between the horizontal tilting axis 54 and the center of gravity of the combined platform 33 and supported instrument α = tilt angle of the platform 33 from horizontal The theoretical torque curves for instrument and platform 33 having various combinations of weights and centers of gravity are shown in FIG. 11 as curves E through G. As shown in FIG. 11, the actual curves A through D closely approximate the theoretical curves represented by curves E through G.

It will be appreciated that the configuration of the counterbalance assembly may vary from that shown in the figures and described above. Two alternate embodiments of counterbalance spring systems are illustrated FIGS. 12 and 13. As shown in FIGS. 12 and 13, both the commonly mounted ends 120, 122 and the angled ends 124, 126 of the springs 128, 130 may be disposed above or below the tilt axis 132, 134. These embodiments, as well as the embodiment explained above, may utilize either compression, extension, or torsion springs.

Referring now to FIG. 12, the rotating ends 124 of the springs 128 are mounted to a pivoted plate 135 at approximately the two o'clock and ten o'clock positions. The opposite ends 120 of the springs 128 are fixed at a common mounting point. During operation, the plate 135, and hence the spaced ends 124 of the springs 128, rotate about the fixed tilt axis 132. The distance between the common fixed ends 120 of the springs 128 and the tilt axis 132, or the counterbalance radius 136 may be adjusted in order to affect a desired counterbalance torque curve.

In the embodiment shown in FIG. 13, one end of each spring 130 is mounted to pin 122 carried by rocker arm 137, a common point, while the opposite end 126 of each spring 130 is fixed at approximately the four o'clock and eight o'clock positions. The commonly mounted ends of the springs move as the rocker arm 137 rotates. By varying the length of the rocker arm, the distance between the tilt axis 134 and the commonly mounted ends of the springs or counterbalance radius 138, may be varied in order to affect a desired counterbalance curve. The outboard ends 126 of the springs 130 may also be adjusted outward to affect the counterbalance torque curve.

Figure 7:
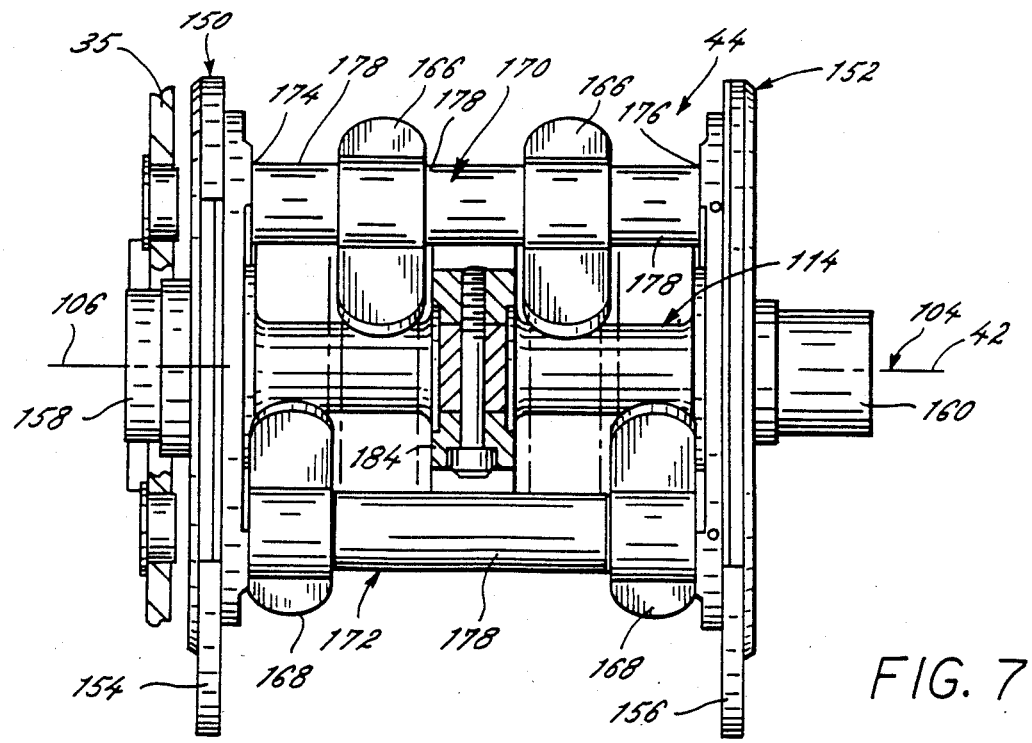
FIG. 7 is a partial sectional view taken along line 7—7 in FIG. 6.

Returning again to the embodiment shown in FIGS. 6 through 10, the counterbalance assembly 56 will be described in more detail in references to FIGS. 6 and 7. The horizontal tilt axis 42 is defined by the lock end tilt shaft 150 and the fluid end tilt shaft 152 disposed on opposite sides of the tilt drum 44. The tilt shafts 150, 152 are castings which include generally circular plates 154, 156 with smaller shaft extensions 158, 160 extending therefrom, respectively. The lock end and fluid end tilt shafts 150, 152 are journaled in the housing 35 on the generally horizontal tilt axis 42 for rotation with respect to the housing 35.

The counterbalance assembly 56 includes eight springs 100 disposed in pairs between lower whiffle trees 162, 164 and upper whiffle trees 166, 168. The lower whiffle trees 162, 164 are rotatably supported along the common axis 104 defined by the crank pin 114. As will be apparent from the drawings, the crank pin axis 104 is parallel to and is disposed in the vertical plane containing the horizontal tilt axis 42.

The upper whiffle trees 166, 168 are disposed in pairs, one pair 166 being disposed on one side of the vertical plane 106, and the other pair 168 being disposed on the opposite side of the plane 106. The upper whiffle trees 166, 168 are rotatably coupled to whiffle tree support shafts 170, 172 which are located at roughly the two o'clock and ten o'clock positions, as shown in FIG. 6. The ends of the whiffle tree support shafts 170, 172 are coupled to the lock end tilt shaft 150 at the interface 174, and the fluid end tilt shaft 152 at the interface 176. In this way, as the tilt drum 44 rotates about the horizontal axis 42 defined by the lock end and fluid end tilt shafts 150, 152, the attached whiffle tree support shafts 170, 172 and rotatably supported upper whiffle trees 166, 168 likewise rotate about the horizontal tilt axis 42 of the tilt drum 44.

In order to maintain the relative spacing of the upper whiffle trees 166, 168 along the support shafts 170, 172, cylindrical whiffle tree spacers 178 are provided. The spacers 178 are disposed along the support shafts 170, 172 between the upper whiffle trees 166, 168, and between the upper whiffle trees 166 and the interfaces 174, 176 with the tilt shafts 150, 152, as shown in FIG. 7.

Figure 14:
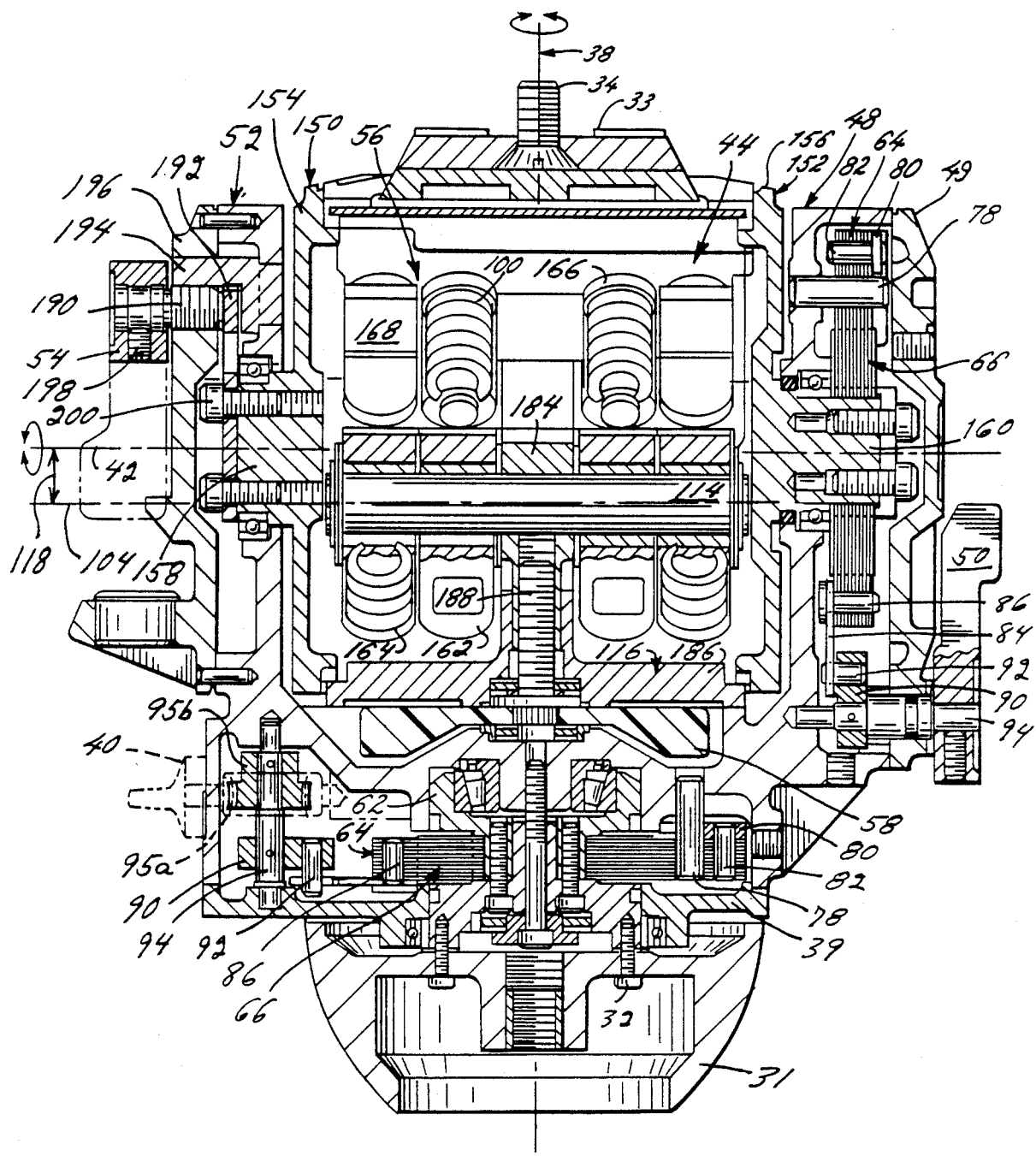
FIG. 14 is a sectional view taken along line 14—14 in FIG. 1.

Referring again to FIG. 1, in order to adjust the level of restoring torque exerted by the counterbalance assembly 56, a counterbalance adjustment 58 is provided which controls the length of the counterbalance radius 118, as explained above. As best illustrated in FIG. 14, to provide movement of the crank pin 114 within the vertical plane 106, the crank pin support assembly 116 includes a crank pin block 184 slidably mounted in the counterbalance adjustment housing 186, which is secured to the housing 35. To adjust the crank pin 114 up or down, the operator rotates the adjustment knob 58 to thread the crank pin adjustment screw 188, which extends through the adjustment housing 186, into or out of the block 184.

In order that the platform 33 may be held substantially steady at a given tilt angle, the invention provides a locking mechanism within the lock end tilt assembly 51, which may be operated by the tilt lock lever 54. As shown in FIG. 14, the locking mechanism includes a tilt lock screw 190 which tightens against a tilt disk brake 192 to sandwich the brake 192 between the tilt lock screw 190 and the tilt lock block 192 to prevent further tilting movement of the platform 33.

The tilt lock screw 190 and the tilt lock block 194 do not rotate about the horizontal tilt axis 42 during tilting action of the tilt drum 44. The tilt lock block 194 is seated within openings in the main body housing 35 and lock end cover 196. The tilt lock screw 190 is threaded into an opening defined by the lock end cover 196 and the tilt lock block 194. The tilt lock lever 54 is secured to the tilt lock screw 190 by a screw 198. In this way, rotation of the tilt lock lever 54 results in axial movement of the attached tilt lock screw 190.

The tilt brake disk 192 is secured to the lock end tilt shaft 150 for rotation therewith by way of cap screws 200. Thus, as the tilt drum 44 rotates about the horizontal tilt axis 42, the tilt brake disk 192 rotates within the space defined by the tilt lock screw 190 and the tilt lock block 194. It will be appreciated that when the platform 33 is at a desired tilt angle, the operator can easily rotate the tilt lock lever 54 to move the tilt lock screw 190 in an axial direction toward the tilt brake disk 192 to sandwich the tilt brake disk 192 between the tilt lock screw 190 and tilt lock block 194. In this way, the tilt brake disk 192, and consequently the platform 33 and tilt drum 44, may be locked at substantially any tilt angle within the tilting range.

Figure 15:
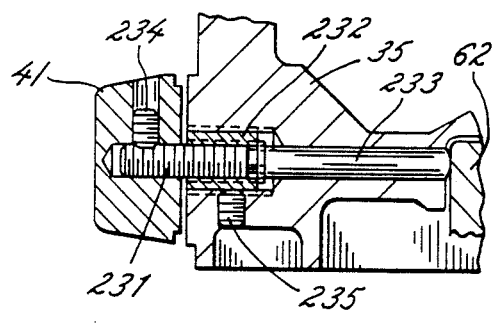
FIG. 15 is a partial sectional view taken along line 15—15 in FIG. 6.

The main body housing 35 may similarly be locked in any horizontal position by the pan lock system shown in FIG. 15. The pan lock system includes a pan brake knob 42, a brake shaft 231, a pan brake insert 232, and a brake pad 233. The pan brake knob 42 is secured to the threaded brake shaft 231 by a screw 234. So that the brake shaft 231 may be rotationally assembled into the main body housing 35, an internally threaded pan brake insert 232 is secured by a screw 235 within a cavity in the main body housing 35. In order to secure the main body housing 35 against movement relative to the pan shaft 62, a brake pad 233 is disposed in a horizontal opening adjacent the inward end of the brake shaft 231 in the main body housing 35, as shown in FIG. 15. As is evident from the figure, rotation of the pan brake knob 42 and associated brake shaft 231 results in an axial movement of the brake shaft 231 within the main body housing 35. Axial movement of the brake shaft 231 results in a corresponding axial movement of the abutting brake pad 233 within the main body housing 35. As the brake shaft 231 is rotated in toward the main body housing 35, the brake pad 233 is caused to bear against the surface of the pan shaft 62 to prevent movement of the main body housing 35 with respect to the pan shaft 62. As the brake shaft 231 is rotated out from the main body housing 35, the brake pad 233 is released from contact with the pan shaft 62, and the housing 35 is free to rotate in a horizontal direction.

In summary, the invention provides a versatile panhead which will smoothly and uniformly rotate 360° in the horizontal direction, and tilt 90° up and 90° down. The counterbalance mechanism includes springs which are disposed in a plane which is substantially vertical and perpendicular to the horizontal tilt axis of a tilt drum. The springs are disposed at an angle from a vertical plane that includes the tilt axis, each having a mounting point along an axis defined by a crank pin which is parallel to the horizontal tilt axis. The crank pin is held steady while the opposite angled ends of the springs rotate about the tilt axis as the tilt drum rotates. The spring system exerts a restoring torque which varies sinusoidally as the tilt angle increases to effectively counterbalance the weight of a supported instrument as the instrument rotates about the horizontal axis. The crank pin may be moved up or down to adjust the distance between the crank pin and tilt axis to account for instruments having different weights or centers of gravity and affect a desired counterbalance torque.

Tilting and panning movements are further controlled by tilt and pan drag systems. A drag disk assembly, comprising alternating sectors and smaller sector spacers, are spaced about the disk assembly and pivotally mounted to the housing on dowel pins. The sector and disk assemblies variably overlap to define a space therebetween in which a viscous fluid is interposed. The level of drag imposed by the drag system is determined by the size of the space between the disk and sector assemblies, such that a minimum space results in maximum drag. The space between the assemblies for both the tilt and drag systems may be adjusted by levers or knobs. Rotation of the lever or knob rotates an associated crank arm to operate a drag link driver. The drag link driver directly pivots one of the sector assemblies toward or away from the disk assembly. Drag links, which connect the sector assemblies, cause the remaining sector assemblies to pivot to an equal distance from the disk assembly. In this way, the panhead may be easily and quickly adjusted for smooth panning and tilting movements.

We claim as our invention:

1. A panhead for supporting an instrument comprising, in combination, a housing, a tilt drum having a substantially horizontal tilt shaft defining a horizontal tilt axis, means for mounting said tilt drum in said housing for rotation about said horizontal tilt axis, a vertical pan shaft defining a vertical pan axis, means for mounting said housing on said vertical pan shaft for rotation about said vertical pan axis, at least two springs mounted in perpendicular planes to said horizontal tilt axis, first means for mounting one end of each of said springs along a common horizontal axis, said common axis lying in a vertical plane containing said tilt axis, second means for mounting the opposite end of each said spring at an equal angle to said vertical plane on opposite sides of said plane, means for securing against rotation relative to the tilt axis one end of each said spring having the same type means for mounting, means for coupling the opposite ends of each said spring to said tilt drum for rotation therewith, such that said springs exert a restoring torque on the tilt down when said tilt axis and said common axis do not coincide, at least one drag assembly for exerting a drag force against rotation of one said shaft, said drag assembly including a circular drag disk assembly mounted to said shaft for rotation therewith, at least two sector assemblies pivotally mounted in said housing about the circumference of said drag disk assembly so that said sector assemblies pivot about axes which are parallel to said axis, said sector assemblies being mounted in said housing substantially adjacent to said drag disk assembly so as to define a space therebetween, each of said sector assemblies being substantially equally distant from said disk assembly, means for pivoting one said sector assembly about its axis, means for coupling said sector assemblies together so that pivoting one said sector assembly causes each said sector assembly to pivot an equal distance from said disk assembly, a viscous fluid disposed in said space between said sector assemblies and said disk assembly whereby rotation of said shaft and said drag disk assembly exerts a drag force against rotation.

2. A panhead as claimed in claim 1 comprising two said drag assemblies, one being mounted along said horizontal tilt axis, the other being mounted along said vertical pan axis.

3. A panhead as claimed in claim 1 wherein said means for coupling said sector assemblies together comprises at least two links and means for pivotally coupling the ends of said links to said sector assemblies such that pivoting one said sector assembly causes the ends of said links coupled to said sector assembly to rotate about said sector assembly pivot axis so that the opposite ends of said links coupled to another said sector assembly exert a force on said other sector assembly to cause said other sector assembly to rotate about its sector assembly pivot axis.

4. A panhead as claimed in claim 1, which further comprises means for varying the distance between said common axis and said tilt axis.

5. A counterbalance mechanism for a panhead comprising, in combination, a tilt drum mounted for rotation about a substantially horizontal tilt axis, at least two springs mounted in perpendicular planes to said tilt axis, first means for mounting one end of each said spring along a common horizontal axis, said common axis lying in a vertical plane containing said tilt axis, second means for mounting the opposite end of each said spring at an equal angle to said vertical plane on opposite sides of said plane, means for securing against rotation relative to said tilt axis one end of each said spring having the same type means for mounting, means for coupling the opposite ends of each said spring to said tilt drum for rotation therewith, such that said springs exert a restoring torque on the tilt drum when said tilt axis and said common axis do not coincide.

6. A counterbalance mechanism as claimed in claim 5, which further comprises means for varying the distances between said common axis and said tilt axis.

7. A counterbalance mechanism as claimed in claim 6, wherein said second means for mounting the opposite end of each said spring at an angle is secured against rotation relative to the tilt axis.

8. A counterbalance mechanism as claimed in claim 6, wherein said means for varying the distance includes a block and a housing, said block being coupled to said common axis, said block being slidably mounted along a vertical axis in said housing, whereby sliding said block in said housing causes said horizontal common axis to move within said vertical plane.

9. A counterbalance mechanism as claimed in claim 8, wherein said means for varying the distance further includes an adjustment screw and an adjustment knob, said adjustment screw extending through an opening in said housing and being threadably coupled to said block, whereby rotation of said adjustment knob causes said block to slide in said housing.

10. A counterbalance mechanism as claimed in claim 6, wherein said first means for mounting one end of each said spring along a common horizontal axis is secured against rotation relative to the tilt axis.

11. A counterbalance mechanism as claimed in claim 7, further comprising at least two support shafts and a crank pin, said crank pin lying along the common horizontal axis, each said spring being mounted to said crank pin along the common horizontal axis, the opposite end of each said spring being mounted to said support shafts, said support shafts being coupled to said tilt drum for rotation therewith.

12. A counterbalance mechanism as claimed in claim 11 wherein said first and second means for mounting include whiffle trees which are rotatably mounted on said support shafts and said crank pin, said spring ends being mounted to said whiffle trees.

13. A counterbalance mechanism as claimed in claim 12, wherein said springs are disposed in parallel pairs, the ends of each of said springs in said pairs being mounted to the same whiffle trees.

14. A counterbalance mechanism as claimed in claim 13, having four pairs of springs, two pairs of said springs being mounted at an angle to said vertical plane along one side of said vertical plane and two pairs of said springs being mounted at an equal angle to said vertical plane along the other side of said vertical plane.

15. A drag mechanism for a camera panhead comprising, in combination,
 a housing,
 a shaft mounted for rotation with respect to said housing about an axis of rotation,
 a circular drag disk assembly mounted to said shaft for rotation therewith,
 at least two sector assemblies pivotally mounted in said housing so that said sector assemblies pivot about axes which are parallel to said axis of rotation, said sector assemblies being mounted in said housing about the circumference of said disk assembly substantially adjacent to said disk assembly so as to define a space therebetween,
 means for variably pivoting one said sector assembly about its axis,
 means for coupling said sector assemblies together so that pivoting one said sector assembly causes each said sector assembly to pivot to an equal distance from said disk assembly,
 a viscous fluid disposed in the space between the sector assemblies and the disk assembly,
 whereby relative rotation of said shaft and said circular drag disk assembly with respect to said housing and said at least two sector assemblies exerts a drag force against rotation.

16. A drag mechanism as claimed in claim 15, wherein said means for coupling said sector assemblies comprises at least two links and means for pivotally coupling the ends of said links to said sector assemblies such that pivoting one said sector assembly causes the ends of said links coupled to said sector assembly to rotate about said sector assembly pivot axis so that the opposite ends of said links coupled to another said sector assembly exert a force on said other sector assembly to cause said other sector assembly to rotate about its sector assembly pivot axis.

17. A drag mechanism as claimed in claim 16, wherein said means for variably pivoting one said sector assembly comprises,
 a driver link pivotally mounted to said one sector assembly,
 a crank arm pivotally mounted to said driver link and to said housing,
 means for variably pivoting said crank arm with respect to said housing, such that pivoting said crank arm with respect to said housing exerts a force on said driver link which causes said one sector assembly to pivot about its axis to adjust the space between said sector assembly and said disk assembly.

18. A drag mechanism as claimed in claim 17, wherein said means for variably pivoting said crank arm with respect to said housing includes a control shaft secured to said crank arm, and a lever secured to said control shaft.

19. A drag mechanism as claimed in claim 17, wherein said means for variably pivoting said crank arm with respect to said housing includes a first control shaft secured to said crank arm, a gear secured to said first control shaft, a second control shaft disposed at an angle to said first control shaft, a worm gear secured to said second control shaft and disposed to mesh with said gear, and an adjustment knob secured to said second control shaft, such that rotation of said adjustment knob rotates said second control shaft and said worm gear, and rotation of said worm gear causes rotation of said gear and said first control shaft and pivoting of said crank arm.

20. A drag mechanism as claimed in claim 16, wherein each said sector assembly includes at least one sector and at least one sector spacer, said sector spacer being smaller in size than said sector, said sector and said sector spacer being secured together to prevent relative motion therebetween, and said drag disk assembly includes at least one drag disk and at least one drag disk spacer, said sector assemblies being mounted in said housing to define radial spaces between said sectors and said drag disk spacer, and between said sector spacers and said drag disk.

* * * * *

UNITED STATES PATENT AND TRADEMARK OFFICE
CERTIFICATE OF CORRECTION

PATENT NO. : 4,955,568

DATED : September 11, 1990

INVENTOR(S) : O'Connor, et al

It is certified that error appears in the above-identified patent and that said Letters Patent is hereby corrected as shown below:

ON THE TITLE PAGE

[57] ABSTRACT, in the fourth sentence, which begins "The counterbalance system," delete the word "two"; after the word "planes" insert -- substantially --. In the final sentence, after the word "The" insert -- restoring torque exerted follows a sinusoidal curve such that it closely approximates the torque created by the platform and the support instrument. Further, the --

Col. 3, line 38-39, delete "platform adjustment" and substitute therefor -- of --.

Col. 3, line 67, delete "42" and substitute therefor -- 41 --.

UNITED STATES PATENT AND TRADEMARK OFFICE
CERTIFICATE OF CORRECTION

PATENT NO. : 4,955,568

DATED : September 11, 1990

INVENTOR(S) : O'Connor, et al

It is certified that error appears in the above-identified patent and that said Letters Patent is hereby corrected as shown below:

Col. 4, line 20, delete "(not shown)".

Col. 5, line 8, after "fluid." insert -- It will be appreciated that the thickness of the fluid layer is important to the smoothness and stability of the hydrodynamic viscous fluid resistive force. --; delete the word "The" and substitute therefor -- In general, the --.

Col. 5, line 13, after the word "will" insert -- be --.

Col. 5, line 67, delete "131" and substitute therefor -- 64a --.

Col. 6, line 3, delete "86" and substitute therefor -- 84 --.

Col. 6, line 48, delete the word "two".

UNITED STATES PATENT AND TRADEMARK OFFICE
CERTIFICATE OF CORRECTION

PATENT NO. : 4,955,568

DATED : September 11, 1990

INVENTOR(S) : O'Connor, et al

It is certified that error appears in the above-identified patent and that said Letters Patent is hereby corrected as shown below:

Col. 6, line 57, delete "109" and substitute therefor -- 110 --.

Col. 7, line 64, after "respectively." insert -- It will be appreciated that curves representing counterbalance radii of alternate dimensions may likewise be used to illustrate the counterbalance torque exerted. --

Col. 8, line 26, after "above." insert -- While the embodiment shown in FIGS. 6-10 includes four pairs of springs, the invention may include fewer or additional pairs of springs, springs that are not arranged in pairs, alternate types of springs, or springs that are arranged in configurations other than those shown. --.

Col. 9, line 4, delete "whiffle trees" and substitute therefor -- rocker brackets, sometimes called "whiffle trees" --

UNITED STATES PATENT AND TRADEMARK OFFICE
CERTIFICATE OF CORRECTION

PATENT NO. : 4,955,568

DATED : September 11, 1990

INVENTOR(S) : O'Connor, et al

It is certified that error appears in the above-identified patent and that said Letters Patent is hereby corrected as shown below:

Col. 9, lines 5-6, delete "whiffle trees" and substitute therefor -- rocker brackets --.

Col. 9, line 11, delete "whiffle trees" and substitute therefor -- rocker brackets --.

Col. 9, line 14, delete "whiffle trees" and substitute therefor -- rocker brackets --.

Col. 9, line 15, delete "whiffle tree" and substitute therefor -- rocker bracket --.

Col. 9, line 18, delete "whiffle tree" and substitute therefor -- rocker bracket --.

UNITED STATES PATENT AND TRADEMARK OFFICE
CERTIFICATE OF CORRECTION

PATENT NO. : 4,955,568

DATED : September 11, 1990

INVENTOR(S) : O'Connor, et al

It is certified that error appears in the above-identified patent and that said Letters Patent is hereby corrected as shown below:

Col. 9, line 23, delete "whiffle tree" and substitute therefor -- rocker bracket --.

Col. 9, line 24, delete "whiffle trees" and substitute therefor -- rocker brackets --.

Col. 9, line 28, delete "whiffle trees" and substitute therefor -- rocker brackets --.

Col. 9, line 29, delete "whiffle tree" and substitute therefor -- rocker bracket --.

Col. 9, line 31, delete "whiffle trees" and substitute therefor -- rocker brackets --.

Col. 9, line 32, delete "whiffle trees" and substitute therefor -- rocker brackets --.

Col. 9, line 36, after the word "adjustment" insert -- knob --.

UNITED STATES PATENT AND TRADEMARK OFFICE
CERTIFICATE OF CORRECTION

PATENT NO. : 4,955,566

DATED : September 11, 1990

INVENTOR(S) : O'Connor, et al

It is certified that error appears in the above-identified patent and that said Letters Patent is hereby corrected as shown below:

Col. 9, line 51, delete "51" and substitute therefor -- 52 --.

Col. 9, line 53, delete "disk brake" and substitute therefor -- brake disk --.

Col. 9, line 54, delete "brake" and substitute therefor -- disk --.

Col. 9, line 55, delete "192" and substitute therefor -- 194 --.

Col. 10, line 16, delete "42" and substitute therefor -- 41 --.

Col. 10, line 17, delete "42" and substitute therefor --41--.

UNITED STATES PATENT AND TRADEMARK OFFICE
CERTIFICATE OF CORRECTION

PATENT NO. : 4,955,568

DATED : September 11, 1990

INVENTOR(S) : O'Connor, et al

It is certified that error appears in the above-identified patent and that said Letters Patent is hereby corrected as shown below:

Col. 10, line 28, delete "42" and substitute therefor -- 41 --.

IN THE CLAIMS

Claim 1, col. 11, line 19, after the word "a" insert -- substantially --.

Claim 1, col. 11, line 22, after the word "a" (first occurrence) insert -- substantially --; after the word "a" (second occurrence) insert -- substantially --.

Claim 1, col. 11, line 25, after the word "in" insert -- substantially --.

Claim 1, col. 11, line 28, after the word "common" insert -- substantially --.

Claim 1, col. 11, line 29, after the word "a" insert -- substantially --.

UNITED STATES PATENT AND TRADEMARK OFFICE
CERTIFICATE OF CORRECTION

PATENT NO. : 4,955,568

DATED : September 11, 1990

INVENTOR(S) : O'Connor, et al

It is certified that error appears in the above-identified patent and that said Letters Patent is hereby corrected as shown below:

Claim 1, col. 11, line 41, delete "down" and substitute therefor -- drum --.

Claim 1, col. 11, line 42, after the word "not" insert -- substantially --.

Claim 1, col. 11, line 61, delete the word "an" and substitute therefor -- a substantially --.

Claim 5, col. 12, line 21, after the word "in" insert -- substantially --.

Claim 5, col. 12, line 24, after the word "common" insert -- substantially --.

UNITED STATES PATENT AND TRADEMARK OFFICE
CERTIFICATE OF CORRECTION

PATENT NO. : 4,955,568

DATED : September 11, 1990

INVENTOR(S) : O'Connor, et al

It is certified that error appears in the above-identified patent and that said Letters Patent is hereby corrected as shown below:

Claim 5, col. 12, line 25, after the word "a" insert -- substantially --.

Claim 5, col. 12, line 27, delete the word "an" and substitute therefor -- a substantially --.

Claim 5, col. 12, line 37, after the word "not" insert -- substantially --.

Claim 8, col. 12, line 48, after the word "a" insert -- substantially --.

Claim 9, col. 12, line 52, delete "8" and substitute therefor -- 6 --.

Claim 10, col. 12, line 61, after the word "common" insert -- substantially --.

Claim 11, col. 12, line 65, after the word "common" insert -- substantially --.

UNITED STATES PATENT AND TRADEMARK OFFICE
CERTIFICATE OF CORRECTION

PATENT NO. : 4,955,568

DATED : September 11, 1990

INVENTOR(S) : O'Connor, et al

It is certified that error appears in the above-identified patent and that said Letters Patent is hereby corrected as shown below:

Claim 12, col. 13, line 5, delete "whiffle trees" and substitute therefor -- rocker brackets --.

Claim 12, col. 13, line 7, delete "whiffle trees" and substitute therefor -- rocker brackets --.

Claim 13, col. 13, line 11, delete "whiffle trees" and substitute therefor -- rocker brackets --.

Claim 14, col. 13, line 16, delete the word "an" and substitute therefor -- a substantially --.

Claim 15, col. 13, line 27, after the word "are" insert -- substantially --.

UNITED STATES PATENT AND TRADEMARK OFFICE
CERTIFICATE OF CORRECTION

PATENT NO. : 4,955,568

DATED : September 11, 1990

INVENTOR(S) : O'Connor, et al

It is certified that error appears in the above-identified patent and that said Letters Patent is hereby corrected as shown below:

Claim 15, col. 13, line 36, delete the word "an" and substitute therefor -- a substantially --.

Claim 15, col. 13, line 42, delete "exerts" and substitute therefor -- exert --.

Claims 21, 22 and 23 have been omitted. The text of these claims is as follows:

-- 21. A counterbalance mechanism as claimed in claim 5, wherein the restoring torque approximates a torque created by an instrument and platform rotating about the horizontal axis.

UNITED STATES PATENT AND TRADEMARK OFFICE
CERTIFICATE OF CORRECTION

PATENT NO. : 4,955,568
DATED : September 11, 1990
INVENTOR(S) : O'Connor, et al

It is certified that error appears in the above-identified patent and that said Letters Patent is hereby corrected as shown below:

22. A counterbalance mechanism as claimed in claim 21, wherein said restoring torque follows a substantially sinusoidal curve.

23. A drag mechanism as claimed in claim 15, wherein the assembly exerts a predetermined level of drag whenever the space between the sector assemblies and the disk assembly is at a predetermined distance. --

Signed and Sealed this

Twenty-sixth Day of April, 1994

Attest:

BRUCE LEHMAN

*Attesting Officer*     *Commissioner of Patents and Trademarks*